April 23, 1957  H. RENAUDIN  2,789,763
DEVICES FOR MAKING CHRONOLOGICAL INVESTIGATION
Filed May 3, 1954  9 Sheets-Sheet 1

Fig. 1

INVENTOR
Henri RENAUDIN
By
Attorneys

April 23, 1957     H. RENAUDIN     2,789,763
DEVICES FOR MAKING CHRONOLOGICAL INVESTIGATION
Filed May 3, 1954     9 Sheets-Sheet 2

Fig. 2

| | January | February | March | April | May | June | July | August | September | October | November | December | |
|---|---|---|---|---|---|---|---|---|---|---|---|---|---|
| Sunday | 28 | 25 | 24 | 21 | 19 | 16 | 14 | 11 | 8 | 6 | 3 | 1 | 29 |
| Saturday | 27 | 24 | 23 | 20 | 18 | 15 | 13 | 10 | 7 | 5 | 2 | 30 | 28 |
| Friday | 26 | 23 | 22 | 19 | 17 | 14 | 12 | 9 | 6 | 4 | 1 | 29 | 27 |
| Thursday | 25 | 22 | 21 | 18 | 16 | 13 | 11 | 8 | 5 | 3 | 31 | 28 | 26 |
| Wednesday | 24 | 21 | 20 | 17 | 15 | 12 | 10 | 7 | 4 | 2 | 30 | 27 | 25 |
| Tuesday | 23 | 20 | 19 | 16 | 14 | 11 | 9 | 6 | 3 | 1 | 29 | 26 | 24 |
| Monday | 22 | 19 | 18 | 15 | 13 | 10 | 8 | 5 | 2 | 30 | 28 | 25 | 23 |
| Sunday | 21 | 18 | 17 | 14 | 12 | 9 | 7 | 4 | 1 | 29 | 27 | 24 | 22 |
| Saturday | 20 | 17 | 16 | 13 | 11 | 8 | 6 | 3 | 31 | 28 | 26 | 23 | 21 |
| Friday | 19 | 16 | 15 | 12 | 10 | 7 | 5 | 2 | 30 | 27 | 25 | 22 | 20 |
| Thursday | 18 | 15 | 14 | 11 | 9 | 6 | 4 | 1 | 29 | 26 | 24 | 21 | 19 |
| Wednesday | 17 | 14 | 13 | 10 | 8 | 5 | 3 | 31 | 28 | 25 | 23 | 20 | 18 |
| Tuesday | 16 | 13 | 12 | 9 | 7 | 4 | 2 | 30 | 27 | 24 | 22 | 19 | 17 |
| Monday | 15 | 12 | 11 | 8 | 6 | 3 | 1 | 29 | 26 | 23 | 21 | 18 | 16 |
| Sunday | 14 | 11 | 10 | 7 | 5 | 2 | 30 | 28 | 25 | 22 | 20 | 17 | 15 |
| Saturday | 13 | 10 | 9 | 6 | 4 | 1 | 29 | 27 | 24 | 21 | 19 | 16 | 14 |
| Friday | 12 | 9 | 8 | 5 | 3 | 31 | 28 | 26 | 23 | 20 | 18 | 15 | 13 |
| Thursday | 11 | 8 | 7 | 4 | 2 | 30 | 27 | 25 | 22 | 19 | 17 | 14 | 12 |
| Wednesday | 10 | 7 | 6 | 3 | 1 | 29 | 26 | 24 | 21 | 18 | 16 | 13 | 11 |
| Tuesday | 9 | 6 | 5 | 2 | 30 | 28 | 25 | 23 | 20 | 17 | 15 | 12 | 10 |
| Monday | 8 | 5 | 4 | 1 | 29 | 27 | 24 | 22 | 19 | 16 | 14 | 11 | 9 |
| Sunday | 7 | 4 | 3 | 31 | 28 | 26 | 23 | 21 | 18 | 15 | 13 | 10 | 8 |
| Saturday | 6 | 3 | 2 | 30 | 27 | 25 | 22 | 20 | 17 | 14 | 12 | 9 | 7 |
| Friday | 5 | 2 | 1 | 29 | 26 | 24 | 21 | 19 | 16 | 13 | 11 | 8 | 6 |
| Thursday | 4 | 1 | 28 | 28 | 25 | 23 | 20 | 18 | 15 | 12 | 10 | 7 | 5 |
| Wednesday | 3 | 31 | 28 | 27 | 24 | 22 | 19 | 17 | 14 | 11 | 9 | 6 | 4 |
| Tuesday | 2 | 30 | 27 | 26 | 23 | 21 | 18 | 16 | 13 | 10 | 8 | 5 | 3 | 31 |
| Monday | 1 | 29 | 26 | 25 | 22 | 20 | 17 | 15 | 12 | 9 | 7 | 4 | 2 | 30 |
| | January | January | February | March | April | May | June | July | August | September | October | November | December | December |

INVENTOR
Henri RENAUDIN

By _(signature)_
Attorneys

April 23, 1957  H. RENAUDIN  2,789,763
DEVICES FOR MAKING CHRONOLOGICAL INVESTIGATION
Filed May 3, 1954  9 Sheets-Sheet 4

INVENTOR
Henri RENAUDIN
By
Attorneys

April 23, 1957 H. RENAUDIN 2,789,763
DEVICES FOR MAKING CHRONOLOGICAL INVESTIGATION
Filed May 3, 1954 9 Sheets-Sheet 5

INVENTOR
Henri RENAUDIN

By

Attorneys

April 23, 1957     H. RENAUDIN     2,789,763
DEVICES FOR MAKING CHRONOLOGICAL INVESTIGATION
Filed May 3, 1954     9 Sheets-Sheet 6

INVENTOR
Henri RENAUDIN

By

Attorneys

April 23, 1957   H. RENAUDIN   2,789,763
DEVICES FOR MAKING CHRONOLOGICAL INVESTIGATION
Filed May 3, 1954   9 Sheets-Sheet 7

INVENTOR
Henri RENAUDIN
By
Attorneys

April 23, 1957 H. RENAUDIN 2,789,763
DEVICES FOR MAKING CHRONOLOGICAL INVESTIGATION
Filed May 3, 1954 9 Sheets-Sheet 9

INVENTOR
Henri RENAUDIN
By
Attorneys

United States Patent Office 2,789,763
Patented Apr. 23, 1957

2,789,763

DEVICES FOR MAKING CHRONOLOGICAL INVESTIGATION

Henri Renaudin, Constantine, Algeria

Application May 3, 1954, Serial No. 427,118

5 Claims. (Cl. 235—89)

The present invention relates to devices for making chronological investigations whether recurrent or not. An object of the invention is to provide a device which can be adapted to produce a copy of any calendar for any desired year, for example, from the year 45 B. C. to 10,000 A. D., and also all data which can be based on or known or predictable cycle relating to the periodic repetition of a past or future event, in particular during the year for which the device is set up or an adjacent year. Calendar devices in accordance with the invention are utilisable in many spheres, such as in medical, agricultural, industrial and other realms.

Use is made in accordance with the invention of a table having the days of the year in fourteen rows, each having twenty-eight (four week) compartments or squares each with one day.

The invention consists of a device for the determination of cyclic or non-cyclic events or occurrences in specified years through the use of calendar sheets upon which are marked the days in fourteen rows of twenty-eight compartments each and the names of the months at beginning and/or end of the rows, while the names of the days of the week are arranged in columns placed at right angles thereto, the device including a plate carrying the calendar sheet and a movable (slider) indicator running correspondingly with the rows of names of months, said indicator bearing a five-fold succession of weekdays (i. e., five times over) and being movable along a side of the day compartments so that any day of the week may be brought into correspondence with any column of figures running at right angles to the vertical rows of names of months.

Owing to the spreading of the days of the week over the calendar year there are seven different years and seven different leap years, i. e., a common year or leap year beginning with a Monday, a Tuesday, a Wednesday, etc., fourteen different calendar sheets are required. Through certain means to be described later, it can easily be determined which of the fourteen calendar sheets must be chosen for a particular year, either past or future. Then, for example, one can determine on which day of the week a certain day of the year in question fell or will fall.

This research device can, however, be simplified by the provision of one calendar sheet for normal years and one for leap years, said sheet corresponding in the arrangement of its compartments to one of the seven calendar sheets described, having, however, virtually a quintuplicate series of week days arranged on a strip separately (or to be exact, a series of thirty-four days of the week is sufficient). This strip is movable along the calendar sheet in such manner that any of the seven days of the week can be brought into coincidence with any of the vertical columns of date figures. In this method the only two calendar sheets required are one for common years and one for leap years. Special auxiliary devices then permit determination of the position which the strip carrying the days of the week must assume with respect to the calendar sheet in question, so that the right days of the week are assigned to the date figures for a particular year.

The invention further forsees for this the application of a plate on which the calendar sheet is fastened and on which the strip with names of days of the week can, sliderwise, be moved so that any day of the week can be brought to coincide with any of the columns which run transversely with respect to the rows bearing the names of the months.

The plate is preferably constructed so that it can receive a calendar sheet on both sides, while the slider is provided with names of days of week on both sides. The device is thereby further simplified since then on the one side of the plates a calendar sheet for normal years may be affixed, and on the other side a sheet for leap years.

The slider provided with names of days of the week is preferably movable in a slit or excision in the plate, which latter over the extent of the excision presents on each side a window through which at any time only a fourfold series of the days of the week indicated on the slider is visible. The calendar sheets are affixed to the plate so that the twenty-eight columns of the date compartments lie exactly under the window, so that one day of the week stands over each column. There are, moreover, devices provided with which the slider can be held in position at any of the seven different positions on the plate. To this end the slider can, for example, present seven holes spaced the distance of the columns apart, and the said holes in turn come into alignment with a hole in the plate into which a locking plug can be inserted. There can, moreover, in order to facilitate identification of the seven different positions of the slider, be provided on the latter seven different symbols to choice, of which one appears in a small window in the plate after setting the slider.

Further arrangements are provided whereby the desired slider position must assume for a particular year can be determined without calculation. This consists of an additional plate with three tables and a second slider, the arrangement being such that by correct setting for the year in question, a code or key is obtained enabling correct setting of the first slider. This arrangement can be duplicated to deal with common years, and leap years.

The invention also provides for the use of an exploratory slider having a window corresponding to one day compartment and two further windows positioned respectively above and below the first windows so that their spacing corresponds to thirteen horizontal rows of the sheet. With this arrangement, if the calendar sheet for the next succeeding year were placed in juxtaposition below the sheet for the first year, the two windows would show the same dates. In the event that the slider has to indicate a date having a particular distance in time away from a known date, the two windows are made so as to be only as large as one day compartment on the calendar sheets. Where the intervals of time being investigated which extend over several days, then these further windows are made large enough to allow the desired number of day compartments to be visible.

For convenience in handling, the search slider has a hand grip rising from its surface at some point near its centre. A search slider with a specified distance of the extra windows is, of course, only usable for one particular purpose, such as the determination of the day of confinement in the case of a woman when the date of last menstruation is known, or the determination of the different periods of the femal cycle likewise when the date of last menstruation is used as a base.

A search slider specially suited for medical purposes of this type displays in addition to two central windows each of the size of a single compartment on the calendar sheets two oblong windows which render visible four consecutive day compartments. These two windows are so positioned with relation to the central window that one or the other of them shows four dates which lie around the 280th day after the date shown in the central window, i. e., either the 278th, 279th, 280th and 281st days or the 279th, 280th, 281st and 282nd days. In normal circumstances these days indicate the probable dates of the confinement. For example, if the central window is placed on the 26th May, the upper window indicates the 1st, 2nd, 3rd and 4th of March. If the central window is placed on the 1st March, the lower window shows the 5th, 6th, 7th and 8th December.

The normal position of the slider upon the calendar sheet when used for this purpose is characterised by the inscription "Top" and "Bottom." In this position, legible inscriptions on the slider permit determining the meaning of the dates appearing in individual windows. More particularly may be observed the fact that the dates to be seen in the upper window lie in the coming year, while those to be seen in the lower window still lie in the current year.

As described more fully below with reference to the drawings, this same slider is also suitable for determining by simple inspection, when the last day of the last menstruation is known, the infertile periods which succeed the end of the functions of the female sex organs, together with the intervening periods of fertility.

For this type of investigation, there is no need to know the days of the week applicable to individual dates. One can therefore employ simple calendar sheets which have no fixed or movable strips with a multiple series of days of the week on them.

It may be mentioned that the rows with twenty-eight day compartments upon the calendar sheets do not necessarily have to lie horizontally. They can also be vertically orientated. In this case the search slider is, of course, placed horizontally and not vertically upon the calendar sheet.

The drawings show schematic examples of the device in accordance with the invention.

Figure 6b is a view of the slider for days of the week as used in the device shown in Figure 6a.

Figure 7b shows a view of the slider positioned at the under portion of the device shown in Figure 6a.

The devices shown in the following figures are for the special medical purposes mentioned, e. g.

Figure 1:
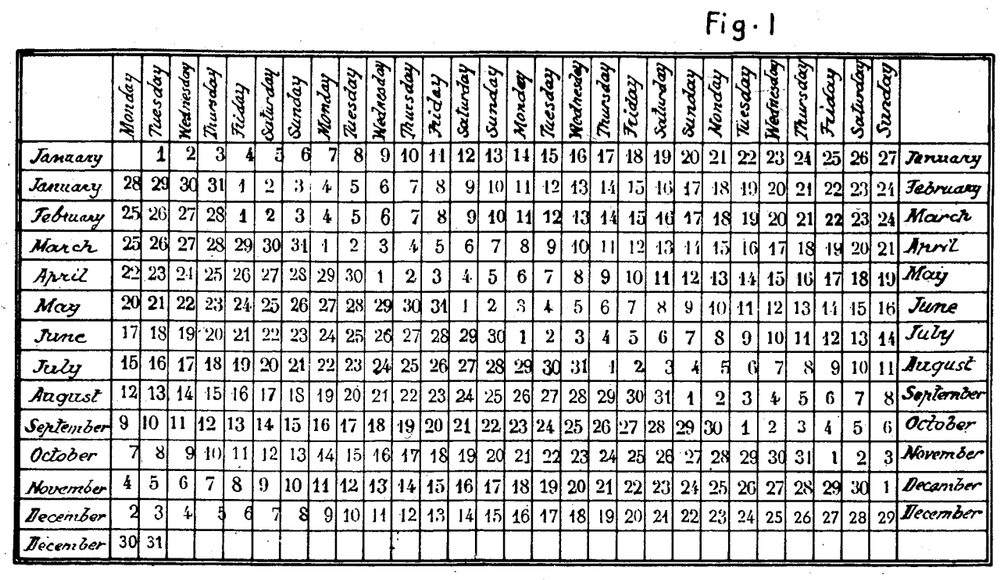
Figure 1 shows one of the fourteen calendar sheets which is selected from the seven sheets for normal years and is valid for a year whose first day is a Tuesday.
Figure 2:
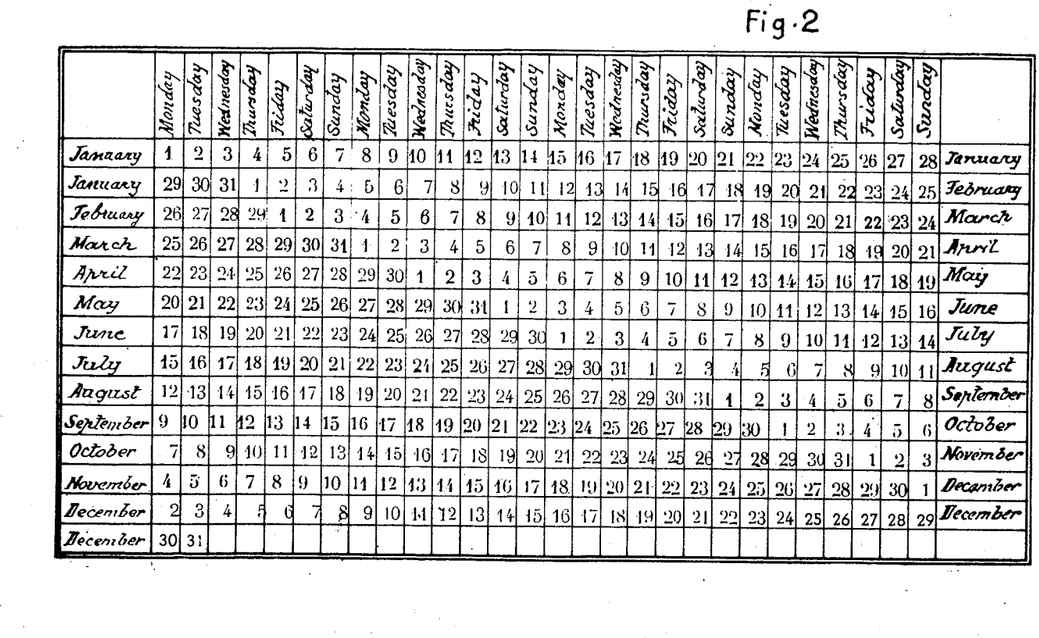
Figure 2 shows a similar calendar sheet selected from the seven sheets for leap years, the first day of the year being a Monday.
Figure 3:
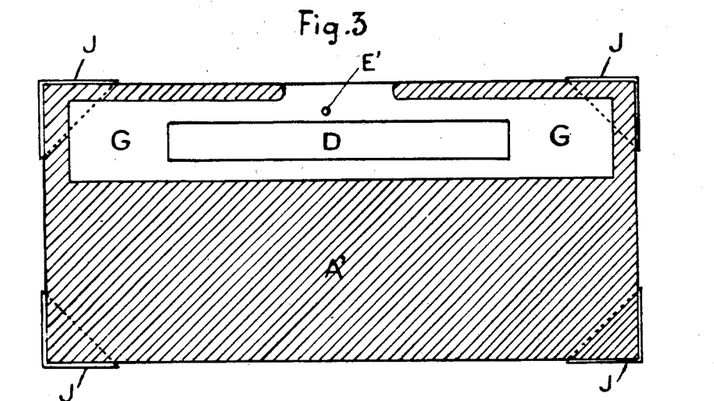
Figure 3 is a section through the baseplate of the device. It is usable on both sides and bears a calendar sheet for common years on its one side and for leap years on its other side.
Figure 4:
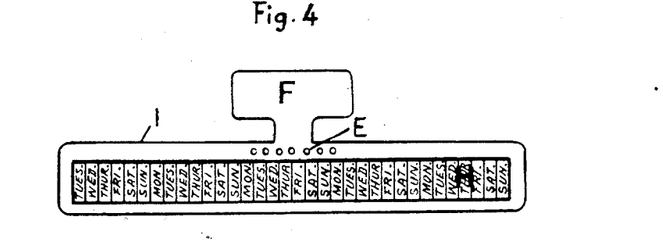
Figure 4 shows the slider for days of the week which belongs to the baseplate.
Figure 5:
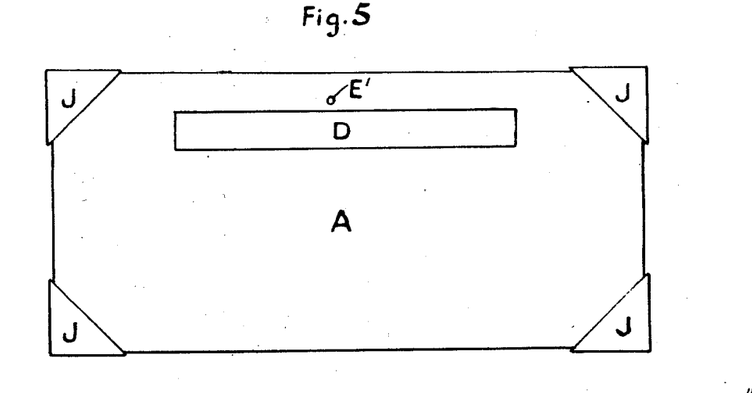
Figure 5 is an exterior view of the baseplate.

The device shown in Figures 3 to 5 consists of a plate A, which has clips J at all four corners under which clips the calendar sheets can be inserted, on the one side to show a calendar sheet for a common year and on the other a sheet for a leap year. In the plate is an oblong excision G in which a slider I can be inserted, said slider displaying on both sides a strip H with thirty-four days of the week extended in normal sequence. In the region of the excision G the plate A is provided on both sides with an oblong window D, through which twenty-eight of the thirty-four days of the week on slider I are visible. Slider I can be moved lengthwise by means of the handgrip F which rises up from the plate A, into seven different positions and secured in the desired position, for example, by means of a plug which is inserted through a hole E' provided in plate A and through one of the seven holes E in slider I.

Figure 6A:
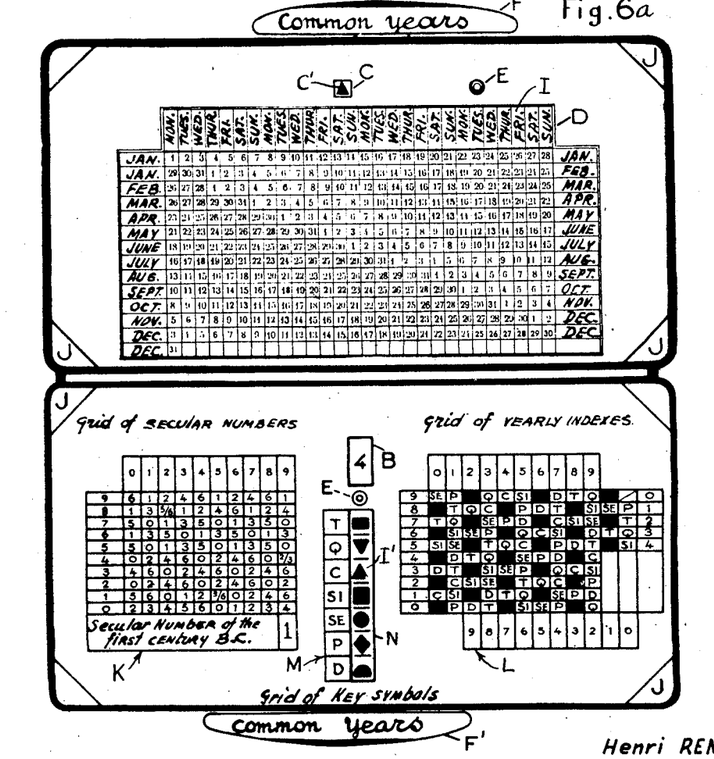
Figure 6a is a view of the baseplate provided with the calendar sheet and the slider of days of the week seen from the side for investigations in normal years, and completed by a second plate with a slider.
Figure 6B:
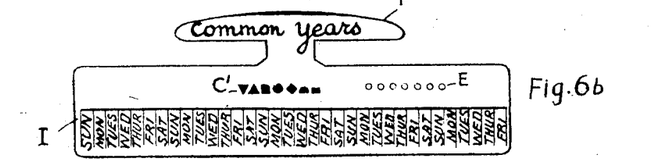
Figure 6C:
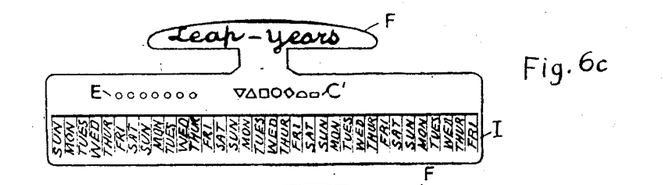
Figure 6c shows a view of the reverse side of the slider of Figure 6b.
Figure 7A:
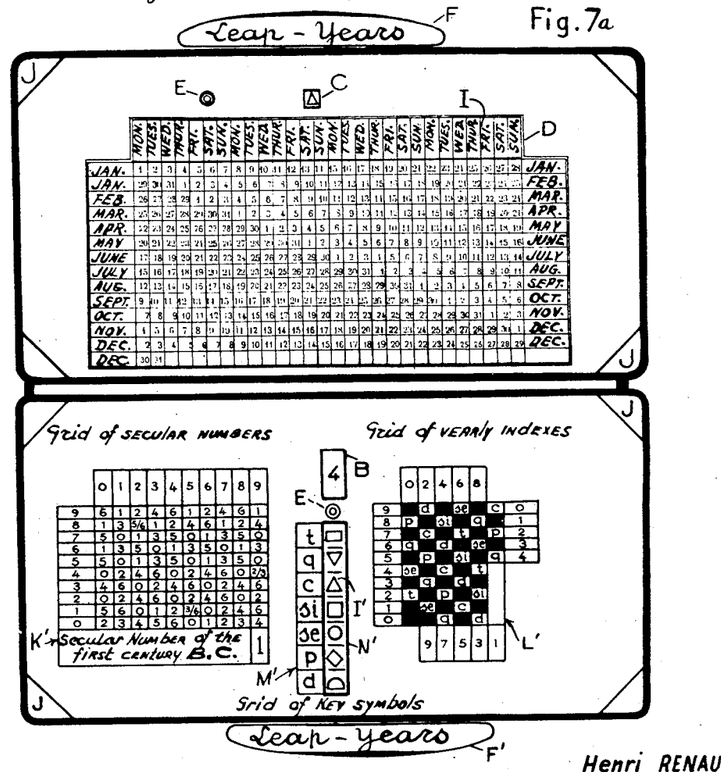
Figure 7a shows a view of the reverse side of the device shown in Figure 6a, for investigations in leap years.
Figure 7B:
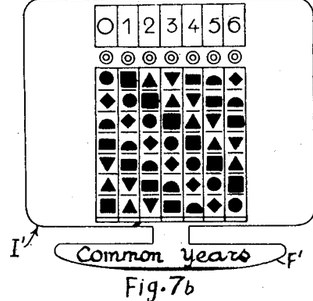
Figure 7C:
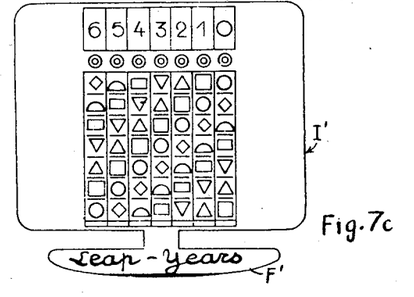
Figure 7c shows the reverse side of the slider of Figure 7b.

Figures 6a and 7a show in their upper portions one side of the plate provided with the calendar sheets and the slider of days of the week. Below this plate is arranged a second similar plate, also usable on both sides. In Figure 6a a calendar sheet for a normal year is laid on the front side of the upper plate, and the slider I so positioned as to place Monday above the first of January. On the reverse side of the device, shown in Figure 7a, the leap year calendar sheet is in position. The slider is in the same position. In addition to the thirty-four days of the week there are upon each side of the slider I seven different symbols C', placed at the same distance apart as the spacing of the compartments provided for the days of the week, and corresponding with the symbols on the slider I' in Figures 7b and 7c in the lower portion of the device. This latter slider is moved by means of hand grip F'. For the symbols C' on the slider I a window C is provided on the upper plate on each side, said window permitting only one of the symbols to be visible. The symbol applicable to a particular year is provided by the tables on the lower plate lettered K, L, M, and K', L', M' respectively.

The indicating device is manipulated as follows—

Each year is characterized by the four figures making up the year. Where a year consists of less than four figures, an appropriate number of zeros are added in front of the existing figures to make up four. The year is read as 0033.

To start with, the secular index is obtained from the left-hand table K on the lower plate; it is shown at the point of intersection of the horizontal spaces associated with the individual thousands and the vertical spaces associated with the individual hundreds of years. The lower slider I' with handgrip F' is so positioned that the indicated century-index figure appears in window B. There then appears in the oblong window N below it a row with the seven different symbols. Then the index of the year concerned in the investigation is determined from the point of intersection of the horizontal and vertical spaces of the table L provided at the right, corresponding to the two last figures of the year. The symbol lying in window N opposite this index is then the required symbol. The slider I with grip F on the upper plate is now moved so as to bring the symbol just obtained into view in window C, and the slider I is then secured in place by means of the plug for hole E'. The calendar for the year desired is now complete.

The following should be noted in this connection—

(a) If in obtaining the year index in table L on the right one lands on a black square, table L' on the reverse side is to be used. Should the table L on the side of the device shown in Figure 6a have been used first, the arrival at a black square indicates that the year in question is a leap year and that therefore the table L' on the reverse side should be used. On the other hand, if one arrives at a black square when using the side of the device shown in Figure 7a, this means that the year in question is a normal year and that therefore the other side must be employed.

(b) For years before Christ, the secular index number 1 is applicable. The year index is obtained by employment of the special row of figures provided on the right and lower side of the tables L and L' at right.

(c) There is no year 0. The Julian calendar starts at the 1st January 45 B. C. and ends on the 4th October 1582. Thursday the 4th October 1582 is followed immediately by Friday the 15th October 1582, this day beginning the Gregorian calendar.

(d) For the period 1 January 1500 to 4 October 1582 the secular index is 3.

(e) 15 October 1582 to 31 December 1599 the index is 6.

(f) 1 January 4900 to 31 December 4903 the index is 2.

(g) For the year 4904 the black square is the symbol.

(h) 1 January 4905 to 31 December 4999 the index is 3.

(i) 1 January 8200 to 31 December 8203 the index is 5.

(k) For year 8204 the black flat rectangle is the symbol.

(l) 1 January 8205 to 31 December 8299 the index is 6.

(m) Year 10,000 has as symbol the light lozenge.

To facilitate the finding of the secular index figures and the year indices, the four figures of the year are preferably assigned four colours, for example, red, yellow, green and violet, and the appropriate strips in the two tables at the lower part of the device are coloured to correspond, viz., the left-hand strips in tables K and K' red, the upper strips in the left-hand tables yellow, the left and right-hand strips in the right-hand tables L and L' green, and the upper and lower strips in the right-hand tables violet.

As described above, the calendar can be set up quickly for any year from 45 B. C. to 10,000 A. D. In like manner, the device permits the reverse operation of quickly indicating all years which have a calendar the same as that of a specified year. For example, to find every year in the 20th century in which the 3rd May falls on a Friday, one proceeds as follows—

(a) For normal years in the 20th century (index figure 6a) it is seen from the upper part of the device, when slider I is properly placed, that Friday stands above the 3rd May with the symbol of the black square in window C. The lower slider I' is then moved to bring the index figure 6 into window B, and the year index P appears in table M opposite the black square symbol in window N. One then consults table L to find all years whose index is shown as P, and arrives at the years 1901, 1907, 1918, 1929, 1935, 1946, 1963, 1974, 1985 and 1991.

(b) For leap years in the 20th century, one obtains in similar manner through use of the other side of the device, the uncoloured triangle at the upper portion as a symbol (triangle with point uppermost) to which there corresponds the year index Se in table M' when slider I' is appropriately manipulated. Then in the right-hand table appears the years 1912, 1940, 1968 and 1996.

Figure 14:
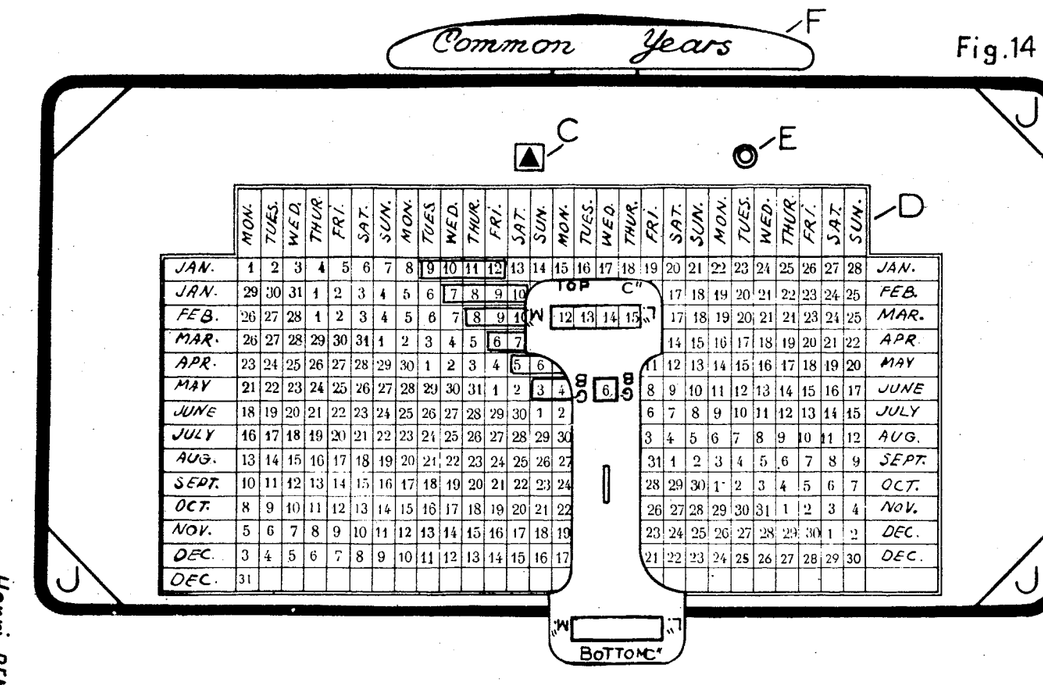
Figure 14 is a view of an indicating device as shown in the upper part of Figure 6a, on a larger scale, with the slider shown in Figure 8 for demonstration of an example of investigation.
Figure 15:
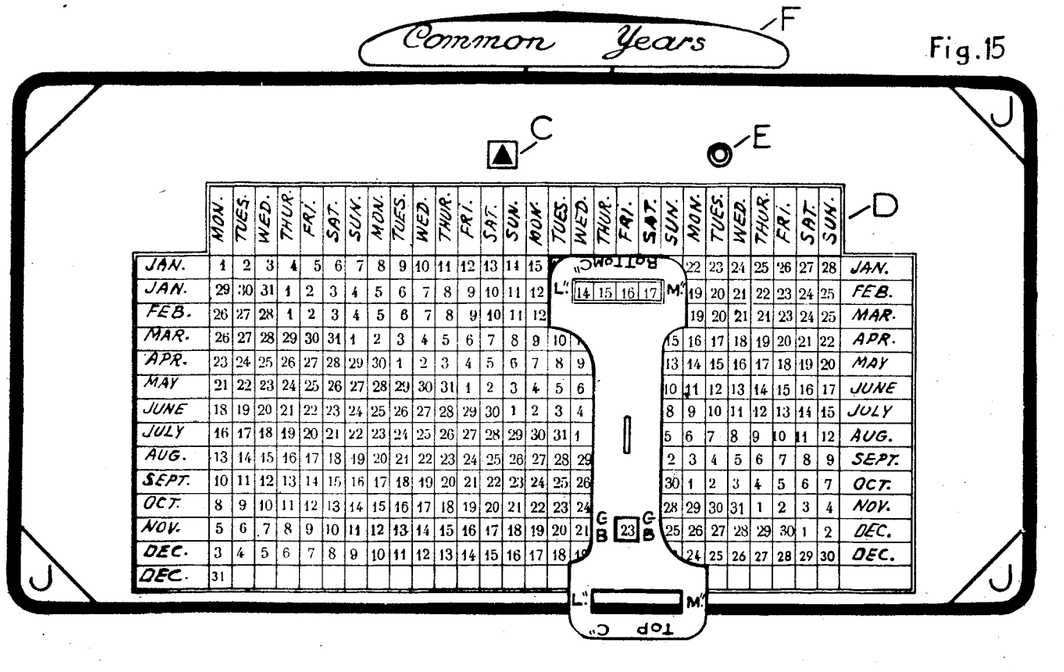
Figure 15 is a view of the same device for demonstration of another example.
Figure 16:
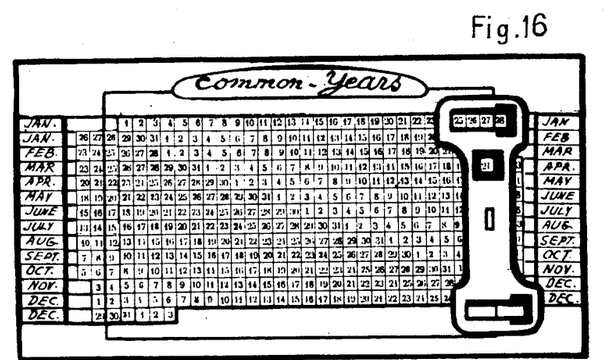
Figure 16 is a view of a similar device on a smaller scale with a slider placed on a normal year calendar sheet extended on both sides.
Figure 17:
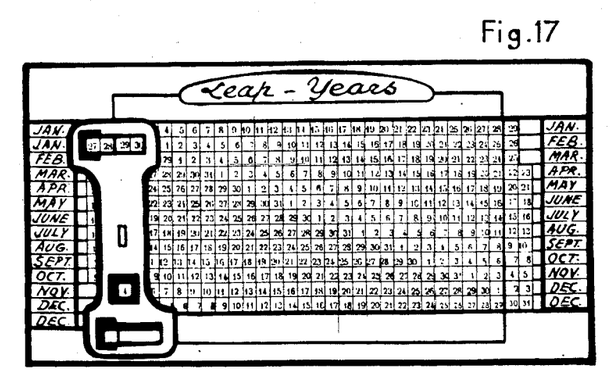
Figure 17 is a view of the same device with a slider placed on a leap year calendar sheet extended on both sides, and vice versa.

The device for obtaining points or periods of time having a certain spacing in time from a given date corresponds in most particulars with the upper portion of the device already described, on which again the calendar sheet is fixed by means of clips J. It is shown in Figures 14 and 15. In the event that the day of the week is not required, then the device can also be utilised without the days of the week slider actuated by handgrip F, as shown in Figures 16 and 17.

For this application of the device there is also provided a search slider, constructed in accordance with the particular purpose of the research being done at the time. The search sliders shown in Figures 8 to 13 serve for location of dates which have relationship with the monthly cycle of women and with confinement. They can be used in two different positions as shown in Figures 8 and 9, and 11–12 respectively. In the position shown in Figures 8 and 9 the search slider has an oblong upper window 3, an oblong lower window 4, and a square central window 2. Approximately in the centre of the slider is a grip 5 rising from its surface, serving to actuate the slider.

In conjunction with the calendar sheet shown in Figures 14 and 15, this slider is used as follows—

(a) Knowing the date of the last menstruation, to find the day of confinement one proceeds as follows—

Suppose the last menstruation ended on the 6th June, 1951, a normal year whose first day was a Monday, the search slider is placed as shown in Figure 14 upon the calendar sheet in such manner that the square on the calendar belonging to the 6th June falls under (in) the square centre window 2 of the slider. Then the upper window 3 gives the normal duration of confinement, in this case the period 12–15 March of the succeeding year.

(b) Given the date of the last period, to find the date of conception, one proceeds as follows—

Figure 8:
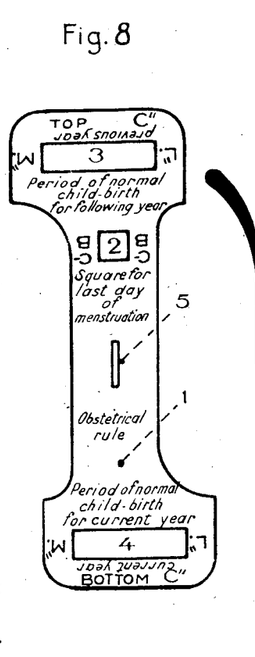
Figures 8 and 9 show two views of a slider for the indicating device shown in Figure 15, both in normal and reverse position.
Figure 9:
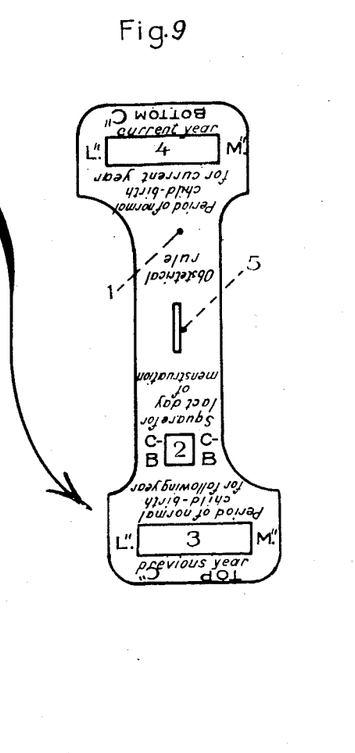
Figures 10, 11, 12:
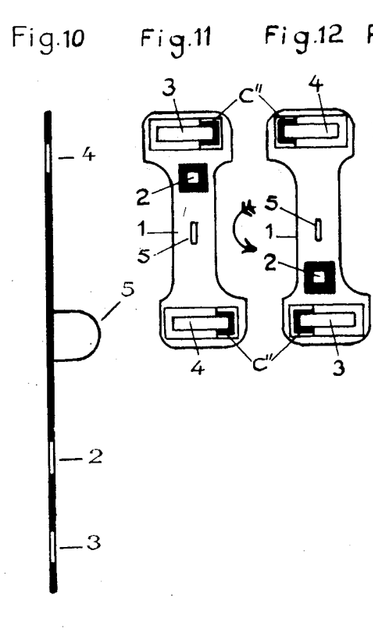
Figure 10 shows a side view of the slider.
Figures 11 and 12 show the same with special indicating signs on a small scale.
Figure 13:
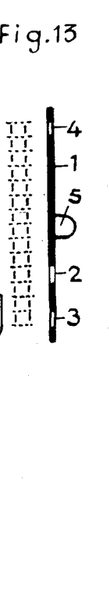
Figure 13 is a side view of this slider.

The obstetrical key used is as in Figure 8. Assuming the last day of menstruation again to be 6th June 1951, the intermediate window 2 is placed to coincide with the compartment 6th June. The date figuring in the upper window 3 or lower window 4 on the level of the right-hand end bearing inscription C" is the equivalent of the day of the menstrual cycle following the last menstruation dating from which conception can have occurred. Here it is the 15th June, 1951, determined by the date 15 of the 15.3.1951.

(c) Given the date, for example, 23rd November, 1951, of a normal confinement, to find the period of the last menstruation.

Invert the obstetrical key (Figure 9), window 3 is now below and 4 above. Bring window 2 into coincidence with calendar compartment corresponding to day of confinement, i. e., 23rd November, 1951. Period of last menstruation is then automatically indicated (Figure 15) by dates 14–17 February, 1951, in window 4 which is now the upper one.

When the period is shown by said window 4 when upper as in present example, it indicates that the last menstruation was in the current year; when in window 3, is in the under position, then in the preceding year.

Figures 16 and 17 show the two faces, front (common years) and rear (leap years) of a device for chronological researches in which it is not, for example, necessary to know or evaluate as before the days of the week corresponding to given dates. Hence there is no band of days of week at front or rear, nor any cursor therefor. Calculations are operated solely on dates. The two code grids shown each have the preferred variant to facilitate reading of the dates when a key or cursor of a certain cycle is to be used. In the present obstetrical case, an obstetrical key necessitating on each side of the central frame of the code grid in question two vertical columns of supplementary dates to correspond with the shape and dimension of the two windows 3 and 4 on the obstetrical key. Provision is made for inscribing the supplementary dates in brighter colours than those of the normal dates within the frame.

The obstetrical key used (in these two examples, key of Figure 11 for Figure 16, and key of Figure 12 for Figure 17) is especially intended for determination of fertile and non-fertile periods following the last day of menstruation, by placing the key normally as in Figure 16 to determine the date of a normal confinement of a pregnant woman, but reversing the key as in Figure 17 to determin the date of the last menstruation when the date of a normal confinement is known. The square indicating the last day of menstruation is coloured black as shown, or in any other colour serving to distinguish it from the others.

The menstrual cycle consists of three periods (a) non-fertile, (b) intermediate fertile period, (c) non-fertile. These three periods transposed to the obstetrical key are distinguished by placing the small square window 2 of the key up on the date corresponding to the last day of menstruation. However, two different positions are provided for the key—either the handle 5 is placed below the square window 2 (normal, Figure 8) or above (inverted, Figure 9).

(1) If the handle 5 of the key is below square notch the date designated by letter "C'''" (or by the special black or other colour or by any other distinguishing mark on window 3) is that which in relation to the current sexual month ends the first non-fertile period starting immediately after menstruation.

(2) If handle 5 is above square notch 2 (key inverted as per Figure 9) date shown by "C" (or other mark as above) is that which in relation to the current sexual month starts the second non-fertile period ending with arrival of next menstruation.

Exceptionally in the three cases of 31st January, 31st March and 31st August, the limits of fertility and non-fertility can fall on date 31, while the sexual month desired may have only 30 days. This 31st must then be treated as a 1.

Figures 16 and 17 each show a case of research to determine these periods with an obstetrical key to find the three sub-divisions of the sexual month.

Variations are possible; for example, other calendar systems can be used. Dimensions can be varied at will. The horizontal dimension can be made vertical and vice versa.

I claim:

1. A calendar having a base plate, a first calendar sheet carried by said base plate and upon which are marked the numerals of the days of the months of the year arranged in fourteen rows of twenty-eight compartments each, said numerals being arranged successively for a whole year without blank compartments between the numerals, the names of the months being inscribed at at least one of the ends of said rows, said compartments being arranged in columns disposed at right angles to said rows, said base plate having a window opening parallel to said rows and having the same length as said rows, a first movable slider indicator slidably mounted within said window opening, said indicator bearing a five fold succession of week day names and movable transversely of said columns to take any one of seven different positions so that any day of the week may be brought into correspondence with any one of said columns, means to releasably lock said slider indicator in any one of said seven positions, and means associated with said calendar to give an indication of the position of said movable slider indicator for the desired year.

2. A calendar as claimed in claim 1, wherein said last named means comprise a series of seven different juxtaposed symbols marked on said slider indicator and adapted to show individually through a window made in said base plate and a first selector sheet mounted on an extension of said base plate, said first selector sheet having a small window and a large window in correspondence with similar windows made in said base plate, an additional slider indicator movably mounted in said base plate extension and marked with a plurality of columns of various combinations of said symbols and with a series of different numbers each in correspondence with one of said columns, said columns and numbers being adapted to show through said small window and said large window respectively, and two tables marked on said first selector sheet, one of said tables consisting of a grid of secular numbers for determining which number on said additional slider will show through said small window in accordance with the century desired, the other of said tables giving an indication of the symbol corresponding to the year desired within said century.

3. A perpetual calendar comprising a base plate, a first calendar sheet provided for common years and carried on one side of said base plate, a second calendar sheet provided for leap years and carried on the reverse side of said base plate, said first and second calendar sheets being marked with the numerals of the days of the months of the year arranged in fourteen rows of twenty-eight compartments each, said numerals being arranged successively for a whole year without blank compartments between the numerals, the names of the months being inscribed at at least one of the ends of said rows, said compartments being arranged in columns disposed at right angles to said rows, said base plate having a window opening at opposite sides thereof and parallel to said rows and having the same length as said rows, a first slider indicator slidably mounted within said window, said indicator bearing on each side thereof, a five fold succession of week day names and movable transversely of said columns to take any one of seven different positions so that any day of the week may be brought into correspondence with any one of said columns of said first and second calendar sheets respectively, means to releasably lock said slider indicator in any one of said seven positions, and means associated with said calendar to give an indication of the position of said slider indicator for the desired year, said last named means comprising a series of seven different juxtaposed symbols marked on each side of said slider indicator and adapted to show individually through windows made in both sides of said base plate and first and second selector sheets provided for common and leap years respectively mounted on opposite sides of an extension of said base plate, said first and second selector sheets each having a small window and a large window in correspondence with similar windows made in said base plate extension, an additional slider indicator movably mounted in said base plate extension and marked on each side thereof with a plurality of columns of various combinations of said symbols and with a series of different numbers each in correspondence with one of said columns, said columns and numbers being adapted to show through said small window and said large window respectively, and two tables marked on each of said first and second selector sheets, one of said tables consisting of a grid of secular numbers for determining which number on said additional slider will show through said small window in accordance with the century desired, the other of said tables giving an indication of the symbol corresponding to the year desired within said century.

4. A calendar as claimed in claim 1, further including a second base plate connected to said first named base plate and a selector sheet mounted on said second base plate and on which are marked three supplementary tables to permit the positioning required for a particular year of the said slider indicator bearing the names of the days of the week, the first table providing one of seven secular indices for each century, the second table providing one of seven yearly indices for each year of a century and the third table providing one of seven symbols for each combination of a secular index and a yearly index, said second base plate being provided with two windows to register with two windows on said selector sheet, a second slider indicator slidably mounted in said second base plate and bearing seven columns of seven compartments each with the various symbols and for every row one of the secular indices, said windows allowing a single column of said second indicator and the corresponding secular index to be visible therethrough, said second slider indicator being adjusted according to the data obtained from said first table and the symbol from the selected row of symbols showing through said windows being selected according to the data obtained from said second table, said selected symbol serving to determine the position of the first slider indicator bearing the names of the days of the week according to the particular year that it is desired to be shown by the calendar.

5. A calendar as claimed in claim 1, further including a search indicator movable over the calendar sheet for indication of dates or periods at a specified time distance from a given date, said indicator presenting a window corresponding in size to a compartment of said calendar sheet and two further oblong windows covering several adjacent numerals of the calendar sheet and which are positioned above and below the first window respectively at a distance from said first window of ten and three rows of the calendar sheet respectively whereby when said first window lies on the uppermost row, the lower window lies on the lowermost row of the calendar sheet.

References Cited in the file of this patent

UNITED STATES PATENTS

| | | |
|---|---|---|
| 1,711,041 | Carson | Apr. 30, 1929 |
| 2,575,555 | La Plante | Nov. 20, 1951 |
| 2,284,810 | O'Kane | Feb. 5, 1952 |

FOREIGN PATENTS

| | | |
|---|---|---|
| 24,993 | Great Britain | Dec. 31, 1895 |
| 544,646 | France | Dec. 17, 1921 |